(12) United States Patent  
Baek

(10) Patent No.: US 8,752,079 B2
(45) Date of Patent: Jun. 10, 2014

(54) OPTICAL DISC DRIVE INCLUDING SPINDLE MOTOR ASSEMBLY

(71) Applicant: Nam-kook Baek, Suwon (KR)

(72) Inventor: Nam-kook Baek, Suwon (KR)

(73) Assignee: Toshiba Samsung Storage Technology Korea Cooperation, Suwon-si (KR)

( * ) Notice: Subject to any disclaimer, the term of this patent is extended or adjusted under 35 U.S.C. 154(b) by 0 days.

(21) Appl. No.: 13/627,096

(22) Filed: Sep. 26, 2012

(65) Prior Publication Data

US 2013/0104152 A1 Apr. 25, 2013

(30) Foreign Application Priority Data

Oct. 24, 2011 (KR) .................. 10-2011-0108810

(51) Int. Cl.
*G11B 17/028* (2006.01)

(52) U.S. Cl.
USPC ........................................ 720/697

(58) Field of Classification Search
USPC .......... 720/697, 601, 663, 661, 690, 691, 696
See application file for complete search history.

(56) References Cited

U.S. PATENT DOCUMENTS

| | | | |
|---|---|---|---|
| 6,792,614 B1 * | 9/2004 | Matsumura et al. | 720/700 |
| 7,577,969 B2 * | 8/2009 | Chen et al. | 720/689 |
| 8,359,607 B2 * | 1/2013 | Yamauchi et al. | 720/650 |
| 2001/0021155 A1 * | 9/2001 | Saito | 369/75.1 |
| 2006/0212891 A1 * | 9/2006 | Chen et al. | 720/689 |
| 2009/0310460 A1 * | 12/2009 | Ezawa et al. | 369/100 |
| 2012/0181885 A1 * | 7/2012 | Yoo et al. | 310/71 |
| 2013/0104152 A1 * | 4/2013 | Baek | 720/601 |

FOREIGN PATENT DOCUMENTS

| | | |
|---|---|---|
| KR | 20-0198115 Y1 | 10/2000 |
| KR | 10-0528335 B1 | 11/2005 |
| KR | 10-1026032 B1 | 3/2011 |

OTHER PUBLICATIONS

Korean Office Action issued Sep. 19, 2012 in counterpart Korean Patent Application No. 10-2011-0108810 (3 pages, in Korean).

* cited by examiner

*Primary Examiner* — Allen T Cao
(74) *Attorney, Agent, or Firm* — NSIP Law

(57) ABSTRACT

Provided is an optical disc drive including a tray on which a spindle motor assembly is mounted. The spindle motor assembly may include a turntable, a conductive plate to which a motor is fixed, a frame to which the conductive plate is fixed, a flat cable that is connected to the spindle motor and includes a ground line, and a first coupling member that passes through the flat cable and the conductive plate and is coupled to the frame.

7 Claims, 5 Drawing Sheets

OPTICAL DISC DRIVE INCLUDING SPINDLE MOTOR ASSEMBLY

CROSS-REFERENCE TO RELATED APPLICATION(S)

This application claims the benefit under 35 USC §119(a) of Korean Patent Application No. 10-2011-0108810, filed on Oct. 24, 2011, in the Korean Intellectual Property Office, the entire disclosure of which is incorporated herein by reference for all purposes.

BACKGROUND

1. Field

The following description relates to an optical disc drive, and more particularly, to a spindle motor assembly for an optical disc drive.

2. Description of Related Art

An optical disc drive includes a spindle motor for driving a disc. A flat cable to electrically connect to a main board is provided on the spindle motor. The flat cable typically includes one ground line and a plurality of signal lines. A spindle motor assembly typically includes a rotor on which a disc is mounted, a stator that is disposed under the rotor, and a conductive plate that allows the rotor to be fixed thereto and which functions as a shield plate for protecting the stator and the rotor from external electrical noise.

The conductive plate is typically fixed to a movable frame of the optical disc drive using a fastening member or the like, and the ground line included in the flat cable is electrically connected to the conductive plate using a separate connecting member. If the amount of parts to and the number of processes needed to assemble the spindle motor assembly are reduced, manufacturing costs of the optical disc drive may also be reduced.

SUMMARY

In an aspect, there is provided an optical disc drive including a spindle motor that comprises a turntable, a conductive plate comprising a motor fixed thereto, a frame to which the conductive plate is fixed, a flat cable that is connected to the spindle motor and that comprises a ground line, and a first coupling member that intersects with the flat cable and the conductive plate and that is coupled to the frame.

The first coupling member may electrically connect the ground line of the flat cable to the conductive plate.

The optical disc drive may further comprise second and third coupling members that are provided on respective sides of the first coupling member and which fix the conductive plate to the motor.

The second and third coupling members may be provided on portions that do not intersect with the flat cable.

The optical disc drive may further comprise a motor fixed base formed on the frame, wherein the flat cable is fixed to the motor fixed base.

The frame may comprise a plastic material, and the motor fixed base may comprise a metal plate material.

In an aspect, there is provided a tray for an optical disc drive, the tray including a fixed base, and a spindle motor assembly mounted on the fixed base, the spindle motor assembly comprising a turntable to rotate a disc, a motor to rotate the turntable, and a conductive plate which supports the motor for rotating the turntable.

The tray may further comprise a cable which is connected to the conductive plate and comprising a ground line.

The tray may further comprise one or more coupling holes that are formed on edge portions of the conductive plate, wherein at least one coupling hole intersects the cable.

The tray may further comprise at least one coupling member inserted into the at least one coupling hole that intersects the cable, wherein the at least one coupling member electrically connects the conductive plate and the ground line of the cable and fixes the conductive plate to the fixed base.

Other features and aspects may be apparent from the following detailed description, the drawings, and the claims.

Figure 1:
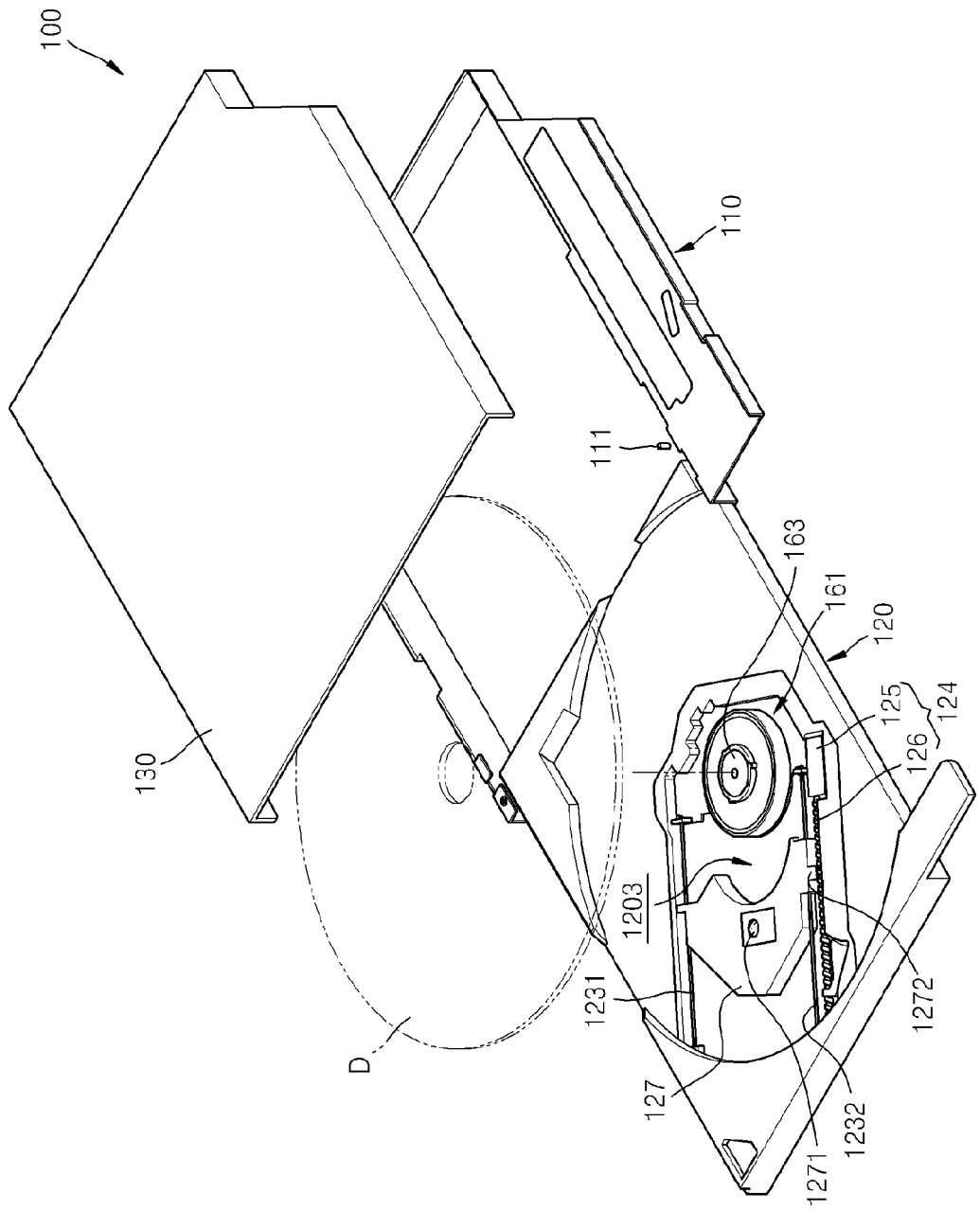
FIG. 1 is a diagram illustrating an example of an optical disc drive.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
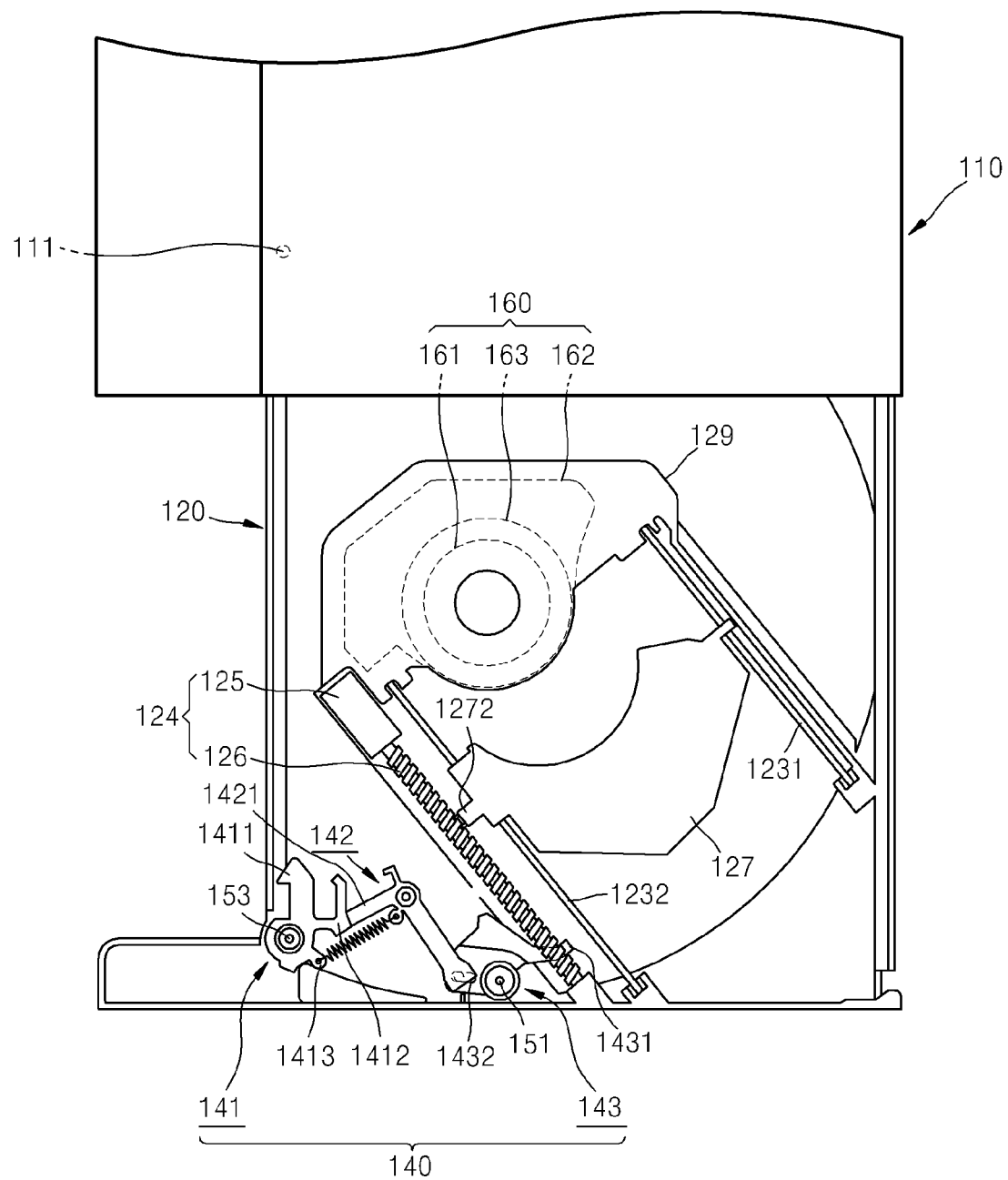
FIG. 2 is a diagram illustrating an example of a rear surface of a tray of the optical disc drive of FIG. 1.

FIG. 1 illustrates an example of an optical disc drive 100 including a spindle motor assembly. FIG. 2 illustrates an example of a rear surface of the optical disc drive 100 of FIG. 1.

Referring to FIG. 1, the optical disc drive 100 includes a main chassis 110, a cover 130 that covers the top of the main chassis 110 and forms a predetermined space between the cover 130 and the main chassis 110, and a tray 120 that receives a disc D and which slides into and out of the main chassis 110.

The tray 120 functions as a frame on which a plurality of features may be mounted. In the example of FIG. 1, a spindle motor 161, an optical pickup portion 1271, a pickup feeding portion 124, and the like are mounted on the tray 120. For example, the tray 120 may include a turntable 163 on which the disc D is mounted, the spindle motor 161 that rotates the turntable 163, and a pickup base 127 that includes the optical pickup portion 1271 for writing or reading information by emitting light to the disc D. In this example, the pickup base 127 is provided in a cavity portion 1203 corresponding to a space in which a pickup is fed, and guide shafts 1231 and 1232 that guide a linear reciprocation of the pickup base 127 are disposed on both sides of the pickup base 127. The pickup feeding portion 124 includes a lead screw 126 for reciprocating the pickup base 127. A feed motor 125 for rotating the lead screw 126 is provided on a side of the pickup base 127. A feed guide 1272 for transmitting a rotational force of the lead screw 126 to the pickup base 127 is provided on the pickup base 127. In addition, a locking protrusion 111 that is caught by a hook portion is formed on an inner bottom surface of the main chassis 110.

Referring to FIG. 2, a locking release unit 140 including a lock lever portion 141, a connecting portion 142, and a link portion 143 is provided on a rear surface of the tray 120. The locking release unit 140 releases locking of the tray 120 by being inserted into the main chassis 110. The locking release unit 140 is disposed adjacent to the lead screw 126, and releases locking of the tray 120 in association with the lead screw 126.

The lock lever portion 141 by which the tray 120 is locked and released is pivotably coupled to a pivot shaft 153 that is disposed on the rear surface of the tray 120. In this example, the lock lever portion 141 includes a hook portion 1411 that is coupled to the locking protrusion 111 which protrudes from inner bottom surface of the main chassis 110. The lock lever portion 141 also includes a pivotal force receiving portion 1412 that contacts the connecting portion 142 and receives a pivotal force, and a spring fixing portion 1413 to which one side of a spring 144 is fixed.

The link portion 143 to which a pivotal force is transmitted is pivotably inserted into a pivotal shaft 151 disposed on the rear surface of the tray 120. In this example, the link portion 143 includes a connection hole 1432 to which the connecting portion 142 is connected and an interference portion 1432 that extends by a predetermined length to contact the feed guide 1272. An interference portion 1431 is formed to face the lead screw 126.

In FIG. 2, a spindle motor assembly 160 is disposed in a direction in which the pickup base 127 supported by the guide shafts 1231 and 1232 moves to face the pickup base 127. The spindle motor assembly 160 is provided on a motor fixed base 129 that is disposed on the tray 120. For example, the spindle motor assembly 160 may include a motor 161, the turntable 163 that is rotated by the motor 161, and a conductive plate 162 that is disposed under the motor 161 to support the motor 161 and which are coupled to the motor fixed base 129. The tray 120 may be formed of a plastic material, and the motor fixed base 129 may be formed of a metal plate material which is integrally formed with the tray 120 by being injected into a mold while the tray 120 is manufactured.

Figure 3:
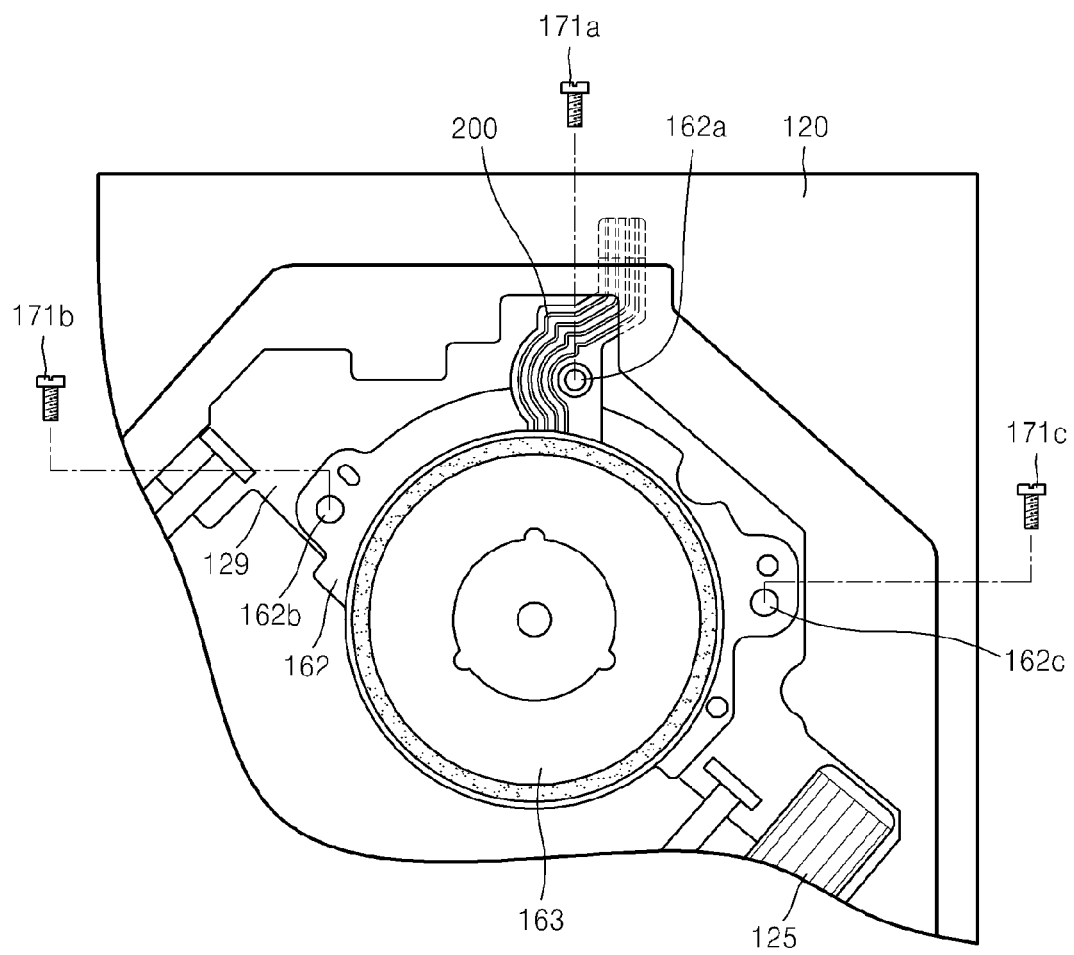
FIG. 3 is a diagram illustrating an example of a spindle motor assembly of the optical disc drive of FIG. 1.

FIG. 3 illustrates an example in which the spindle motor assembly 160 is mounted on the motor fixed base 129 that is disposed on the tray 120. As described above, the conductive plate 162 that supports the motor 161 for rotating the turntable 163 may be fixedly mounted on the motor fixed base 129. For example, a first through third coupling holes 162a, 162b, and 162c, may be formed in edge portions of the conductive plate 162. First, second, and third coupling members, for example, first, second, and third screws 171a, 171b, and 171c, may be inserted into the first through third coupling holes 162a, 162b, and 162c, respectively. In this example, the first screw 171a which is a middle screw from among the first through third screws 171a, 171b, and 171c, passes through a flat cable 200 that extends from the motor 161.

Figure 4:
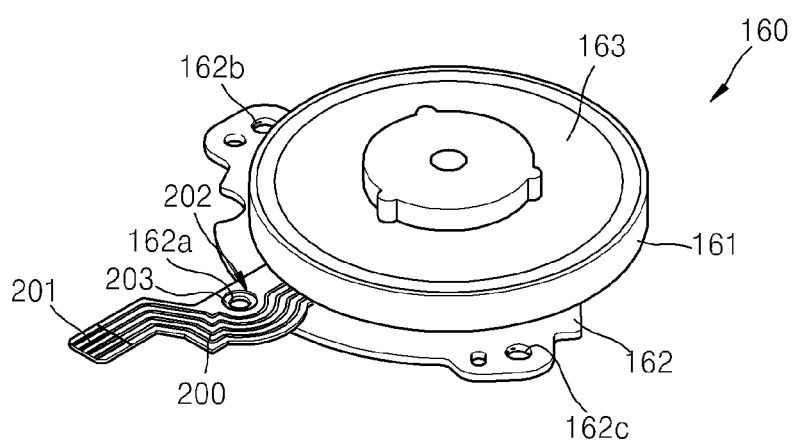
FIG. 4 is a diagram illustrating another example of the spindle motor assembly of the optical disc drive of FIG. 1.
Figure 5:
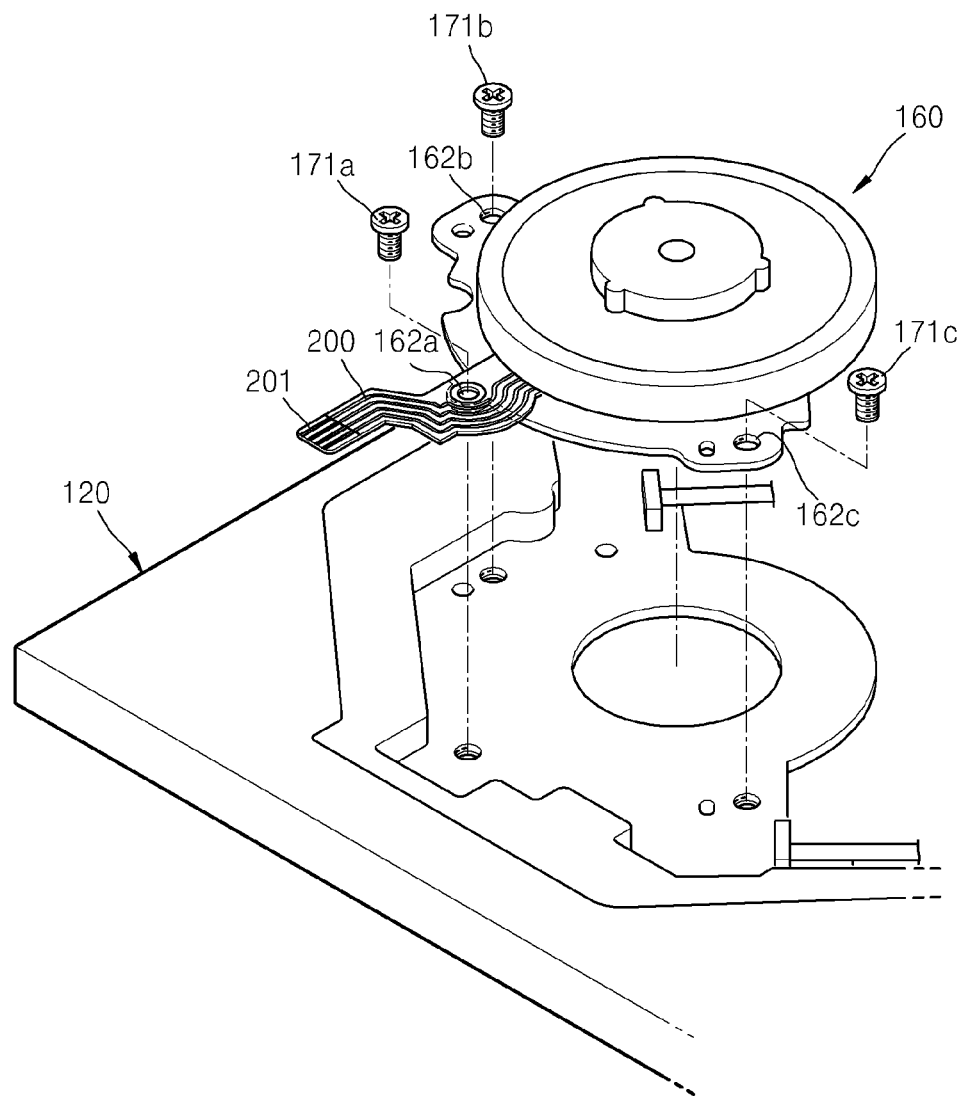
FIG. 5 is a diagram illustrating an example of an exploded perspective view of the spindle motor assembly and a motor fixed base disposed on the tray of the optical disc drive of FIG. 1.
Figure 6:
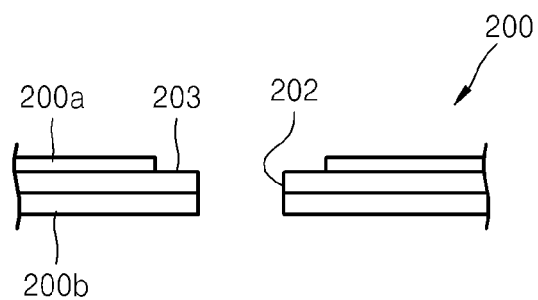
FIG. 6 is a diagram illustrating an example of a cross-sectional view of a flat cable of the spindle motor assembly of the optical disc drive of FIG. 1.

FIG. 4 illustrates an example of the spindle motor assembly 160. FIG. 5 illustrates an example of an exploded perspective view of the spindle motor assembly 160 and the motor fixed base 129 to which the spindle motor assembly 160 is fixed. FIG. 6 illustrates an example of a partial cross-sectional view of a through-hole 202 formed in the flat cable 200 and a ground line 203 exposed around the through-hole 202.

Referring to FIG. 4, the turntable 163 is a rotor of the motor 161 in which a magnet is disposed. A stator including an armature coil corresponding to the magnet is disposed under the turntable 163. The stator is fixed to the conductive plate 162. The flat cable 200 extends outward from the motor 161. An electrical contact terminal 201 is formed on an end portion of the flat cable 200. The through-hole 202 passes through an upper insulating film 200a, the ground line 203, and a lower insulating film 200b, and is formed in an overlapping edge portion of the conductive plate 162. A surface of the ground line 203 is exposed in the form of a doughnut around the through-hole 202 by removing the upper insulating film 200a by a predetermined width.

In this example, an exposed surface of the ground line 203 contacts a head portion of the first coupling member, for example, the first screw 171a. Accordingly, the ground line 203 may be electrically connected to the conductive plate 162 by the first screw 171a. In this example, the first coupling hole 162a intersects the electrical connection of the flat cable 200. When the first screw 171a is inserted into the first coupling hold 162a, the ground line 200 and the conductive plate 162 are electrically connected. The flat cable 200 may be fixed by the first screw 171a that passes through the conductive plate 162 and may be coupled to the motor fixed base 129, and the second screw 171b and the third screw 171c may be used to fix the conductive plate 162 and the motor fixed base 129 on both sides of the first screw 162a.

According to various aspects, the motor fixed base 129 may be fixed using the a plurality of coupling members and one of the coupling members, that is, the first screw 171a, may contact the ground line 203 of the flat cable 200. Accordingly, not only the spindle motor assembly 160 is fixed but also the ground line 203 and the conductive plate 162 may be electrically connected to each other. Because the motor 161 and the conductive plate 162 are electrically connected to each other using a member of fixing the spindle motor assembly 160, in comparison to a conventional structure in which a member for connecting a conductive plate and a ground line is additionally used to a fixing member, the amount of parts is reduced and the amount of assembling processes is reduced, thereby reducing manufacturing costs.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical disc drive comprising:
   a spindle motor that comprises a turntable;
   a conductive plate comprising the spindle motor fixed thereto;
   a frame to which the conductive plate is fixed;
   a flat cable that is connected to the spindle motor and that comprises a ground line; and
   a first coupling member that passes through an electrical connection of the ground line of the flat cable and an electrical connection of the conductive plate to thereby electrically connect the ground line of the flat cable with the conductive plate.

2. The optical disc drive of claim 1, further comprising second and third coupling members that are provided on respective sides of the first coupling member and which fix the conductive plate to the motor.

3. The optical disc drive of claim 2, wherein the second and third coupling members are provided on portions that do not intersect with the flat cable.

4. The optical disc drive of claim 1, wherein the frame comprises a plastic material, and the motor fixed base comprises a metal plate material.

5. The optical disc drive of claim 1, wherein the flat cable comprises a through hole that the first coupling member passes through, and a portion of the ground line of the flat cable is exposed around an edge of the through hole.

6. The optical disc drive of claim 1, wherein the ground line is disposed between a lower insulating film and an upper insulating film of the flat cable, and a portion of the upper insulating film is removed to expose a portion of the ground line to enable the first coupling member to electrically connect the ground line to the conductive plate.

7. An optical disc drive comprising:
a spindle motor that comprises a turntable;
a conductive plate comprising the spindle motor fixed thereto;
a frame to which the conductive plate is fixed;
a flat cable that is connected to the spindle motor and that comprises a ground line;
a motor fixed base formed on the frame, wherein the flat cable is fixed to the motor fixed base; and
a first coupling member that intersects with the flat cable and the conductive plate and that is coupled to the motor fixed based and the frame.

* * * * *